United States Patent [19]

Reynolds et al.

[11] 4,276,084

[45] Jun. 30, 1981

[54] HYDROMETALLURGICAL PROCESS FOR THE RECOVERY OF LEAD

[75] Inventors: James E. Reynolds, Golden; Alan R. Williams, Denver, both of Colo.

[73] Assignee: Hazen Research, Inc., Golden, Colo.

[21] Appl. No.: 80,444

[22] Filed: Oct. 1, 1979

[51] Int. Cl.$^3$ ............................................ C22B 13/04
[52] U.S. Cl. ................................... 75/101 R; 75/114; 75/120; 423/94; 423/98; 423/494
[58] Field of Search ..................... 75/101 R, 114, 120; 423/94, 98, 494

[56] References Cited

U.S. PATENT DOCUMENTS

| 704,639 | 7/1902 | Hoepfner | 75/120 X |
|---|---|---|---|
| 1,346,642 | 7/1920 | Elmore | 423/94 X |
| 3,981,962 | 9/1976 | Smyres et al. | 423/94 X |
| 3,998,628 | 12/1976 | Gandon et al. | 423/98 X |
| 4,135,993 | 1/1979 | Um | 423/98 X |

OTHER PUBLICATIONS

Mellor, "Comprehensive Treatise on Inorganic & Theoretical Chemistry", vol. 7, 1927, Longmans, Green & Co., N.Y., pp. 712 and 713.
Wong et al., *World Mining and Metals Technology*, Sep. 1976, pp. 603–622.
Scheiner et al., *1978 Mining Yearbook*, Colo., pp. 133–138.
Murphy et al., *Bureau of Mines, RI* (1976) 7913 pp. 1–8.
Haver, *Bureau of Mines, RI* 8105 (1976) pp. 1–17.
Muir et al., *J. Australasian Inst. of Mining and Metallurgy*, No. 259 (Sep. 1976), pp. 23–35.
Bagdasarian, Trans. of Am. Electrochem. Soc., vol. 51, 1927, pp. 449–494.

*Primary Examiner*—G. Ozaki
*Attorney, Agent, or Firm*—Sheridan, Ross, Fields & McIntosh

[57] ABSTRACT

A hydrometallurgical process is used to recover lead from a lead-bearing ore concentrate. The lead-bearing ore concentrate is leached with a solution of cupric chloride in order to precipitate lead as lead chloride, produce elemental sulfur and substantially leave the balance of the ore concentrate sulfides in unreacted form. The residue of the cupric chloride leach is leached with a brine solution in order to solubilize the lead chloride to the exclusion of the balance of the residue. Thereafter, the lead chloride is crystallized from the brine solution. Elemental lead may be obtained by the reduction of the lead chloride crystals.

The present process avoids air pollution problems inherent to smelting processes, allows for a high recovery of lead of 97% or greater and allows for the direct production of a high purity lead.

21 Claims, 1 Drawing Figure

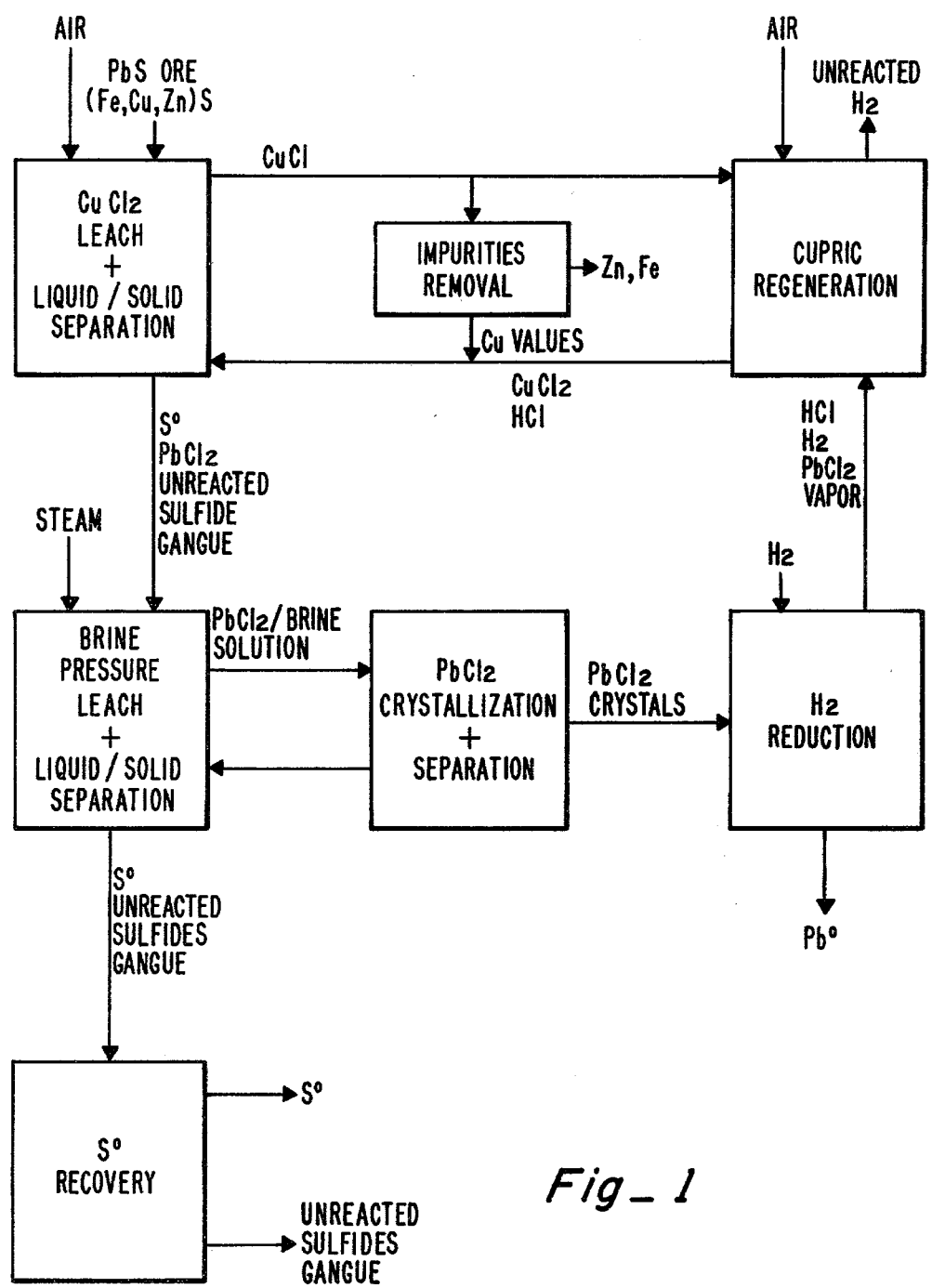
Fig_1

HYDROMETALLURGICAL PROCESS FOR THE RECOVERY OF LEAD

DESCRIPTION

Technical Field

The process of the invention relates to the hydrometallurgical recovery of lead from lead concentrates, and is particularly applicable to separating lead from zinc, iron and copper.

BACKGROUND ART

Prior Art Statement

A leach-electrolysis method for producing lead from galena is disclosed by M. M. Wong and H. P. Haver of the U.S. Bureau of Mines in Chapter 37 of *World Mining and Metals Technology: Proceedings of the Joint MMIP-AIME Meeting,* Denver, Colo., USA, Sept. 1-3, 1976, A. Weiss, Ed. (MMIJ-AIME, 1976). In this process, high grade lead concentrates (about 68 weight percent lead) are leached with ferric chloride and sodium chloride for 15 minutes at 100° C. Lead chloride is crystalized from solution at room temperature and the ferric chloride leachant is regenerated with chlorine. The lead chloride is then reduced by fused salt electrolysis to elemental lead.

B. J. Scheiner and R. E. Lindstrom disclose a chlorine-oxygen leaching technique in "Leaching Complex Sulfide Concentrates Using Aqueous Chloride Oxidation Systems" in the 1978 *Mining Yearbook of the Colorado Mining Association,* pp 133-38. Lead concentrates bearing about 50% lead are leached in a two-step procedure carried out in a pressure reactor with continuous addition of chlorine and oxygen. The ferric and cupric chlorides extracted from the concentrate by the chlorine and oxygen then react to extract lead and other metals as their chlorides. Lead chloride is dissolved from the leach residue by means of hot brine leach at 90° C., crystallized at room temperature, and the lead is reduced by fused salt electrolysis.

A method for leaching galena with ferric chloride is disclosed by J. E. Murphy, F. P. Haver and M. M. Wong in "Recovery of Lead from Galena by a Leach Electrolysis Procedure", *Bureau of Mines Report of Investigations* No. RI 7913 (1974). This disclosure concerns itself primarily with the electrolytic reduction of lead from lead chloride, and discloses ferric chloride leaching of the galena ore and dissolution of the formed lead chloride in 25% brine solution at 100° C. Chlorine is used to regenerate the leachant.

A further disclosure by F. P. Haver and M. M. Wong entitled "Ferric Chloride-Brine Leaching of Galena Concentrate" is published in *Bureau of Mines Report of Investigations* No. RI 8105 (1976). Hot brine (100° C.) and ferric chloride are used to leach the lead chloride from the 68% lead-bearing ore, dissolving the lead chloride as it is formed. Chlorine is used to regenerate the leachant. This is an improvement over the process disclosed in Bureau of Mines Report Number RI 7913, described above, wherein the ferric and brine leaches are not combined.

David M. Muir, Donald C. Gale, A. James Parker, and Dion E. Giles, in "Leaching of the McArthur River Zinc-Lead Sulphide Concentrate in Aqueous Chloride and Chlorine Systems", *J. Australasian Institute of Mining and Metallurgy,* No. 259 (September, 1976), disclose a number of leaching techniques including leaching with hydrochloric acid, ferric chloride, cupric chloride, oxygen, oxygen and chlorine, chlorine alone, and chlorine with cupric chloride. The cupric chloride leach reported was conducted at 95° C. under carbon dioxide pressure with a 1 M hydrochloric acid concentration. Zinc extraction was about 95% after 2 hours, and the cupric leach was not recommended because of high ferric and cupric concentrations along with the zinc chloride in the leach solution. A further disclosure in this article describes the use of cupric chloride as a catalyst with a hydrochloric acid leach (1 to 5 M HCl). Oxygen pressure is used with this process.

A. B. Bagdasarian discloses "Reduction of Metallic Chlorides by Hydrogen" in 51 *Transactions of the American Electrochemical Society,* pp 449-494 (1927). The basic reduction reaction is discussed as well as the theoretical aspects of the process. The author discloses hydrogen reduction of lead chloride in closed tubes, with and without bubbling the hydrogen through the lead chloride.

Disclosure of the Invention

Lead-bearing ore concentrates are leached with cupric chloride under reaction conditions controlled in such a manner so as to extract and precipitate lead as lead chloride, produce sulfur in elemental form, and substantially leave the balance of the concentrate sulfides, particularly zinc, iron and copper, in unreacted form. Leach liquor is continuously sparged with air in order to regenerate the cupric chloride leaching agent in solution.

The residue from the cupric chloride leach is then preferably leached with a brine solution in order to solubilize the lead chloride to the exclusion of the balance of the residue. This brine leach is preferably conducted under pressure and at an elevated temperature in order to enhance the dissolution of the lead chloride.

The lead chloride solution is then separated from the residue, and the lead chloride is crystallized from the solution. The crystallized lead chloride may then be reduced to elemental lead, preferably by means of hydrogen reduction.

The residue from the brine leach step can be further treated in order to recover the elemental sulfur.

BRIEF DESCRIPTION OF THE DRAWINGS

The FIGURE represents a generalized flow diagram showing one preferred lead recovery technique.

BEST MODE FOR CARRYING OUT THE INVENTION

The process of the present invention is suitable for the separation of lead values from metal sulfide ores. The metal sulfides may be any of those commonly associated with lead sulfide, and the process is particularly adaptable to the separation of lead values from metal sulfides selected from the group consisting of zinc, iron and copper. The concentrations of the various sulfide starting materials is not important to the proper conduct of the process, and hence lead sulfide may exist in an amount as low as deemed desirable for separation to an upper limit of nearby pure lead sulfide. Hence lead may be considered the primary product of the process, or may be deemed as an impurity in conjunction with, for example, a relatively high content zinc concentrate. The optimization of process parameters will, of course, vary depending upon the precise constituents of the starting material, consistent with the discussion of the process conditions as hereinafter set forth.

The starting materials are generally concentrated by techniques known to the art in order to separate the metal sulfide values from a substantial portion of the gangue material. The concentrated values are then preferably crushed to a sufficiently small particle size in order to facilitate the leach reaction. The preferred concentrate particle size introduced to the leach step is about $-100$ mesh, more preferably about $-200$ mesh, and most preferably about $-325$ mesh.

The ore concentrate is then leached with cupric chloride under reaction conditions selected so as to extract most of the lead values as lead chloride, while leaving a substantial portion of the remaining metal sulfides, including sulfides of zinc, iron and copper, in their unreacted sulfide form. The lead chloride product is insoluble in the solution, while the small portions of zinc, copper and iron sulfides which are extracted as their corresponding chlorides are dissolved in the solution. The lead chloride product, along with the elemental sulfur and unreacted residue, is separated following the leach from the leach solution containing the relatively small amounts of solubilized metal chlorides.

The required agent for the leach reaction is cupric chloride, with the leach reaction generally being as follows:

$$2CuCl_2 + PbS \rightarrow 2CuCl + PbCl_2 + S°$$

The total copper concentration during the leach reaction is preferably maintained as low as possible in order to enhance the selectivity of the separation. The cupric chloride concentration is therefore selected for a given feed concentrate and other leach variables so as to maximize lead extraction from the sulfides, while minimizing the amount of extraction of the remaining metal sulfides.

The cupric chloride concentration is primarily a function of total copper in solution and solution emf, and solution emf is primarily a function of the ratio of cupric chloride to cuprous chloride. The total copper concentration in solution is preferably maintained within the range of from about 3 to about 100 grams per liter, more preferably from about 5 to about 50 grams per liter, and most preferably from about 8 to about 25 grams per liter.

As the leach reaction continuously reduces the cupric chloride to cuprous chloride, a preferred technique for regenerating the cupric chloride leaching agent is to continuously introduce oxygen and/or air into the leach solution during the leach reaction, thereby oxidizing cuprous chloride to cupric chloride. This oxidation reaction occurs at the relatively low leach temperatures preferred for this leach reaction.

The reduction of cupric chloride by means of the primary leach reaction and the oxidation of cuprous ion by means of the air sparging are preferably controlled so as to maintain a cupric ion to cuprous ion ratio in solution of from about 1:20 to about 16:1, more preferably from about 1:9 to about 4:1 and most preferably from about 1:5 to about 3:1. Consistent with the preferred cupric ion to cuprous ion ratio, the solution emf, which is oxidizing, is preferably maintained during the leach reaction from about 200 to about 500 millivolts, more preferably from about 250 to about 450 millivolts, and most preferably from about 350 to about 400 millivolts, as measured by saturated calomel/platinum electrodes. A primary feature of the invention is the liberation of the sulfide sulfur in elemental form. Solution emf's below about 100 millivolts tend to produce hydrogen sulfide as opposed to solid elemental sulfur.

The total chloride ion concentration maintained during the leach reaction is important for the proper conduct of the reaction, and to solubilize those minor amounts of metal sulfides which are extracted during the leach. The chloride ion concentration is preferably maintained at a level not substantially exceeding that amount sufficient to keep the copper in solution. Chloride ion in excess of this requirement detracts from the selectivity of the process. The chloride ion concentration is maintained primarily by the addition of sodium chloride, although calcium chloride, lithium chloride and potassium chloride may also be used as sources of chloride ion. Preferably the leach solution contains from about 50 to about 300 grams of sodium chloride per liter, and more preferably from about 100 to about 250 grams of sodium chloride per liter.

The acidity of the solution is significant from the standpoint of selectively extracting the lead values to the substantial exclusion of the other metal values. The pH is preferably maintained from about 0.5 to about 4, and more preferably from about 0.5 to about 2. The pH is preferably maintained by the addition of hydrochloric acid so as to result in a solution concentration of hydrochloric acid up to about 20 grams per liter, more preferably from about 1 to about 10 grams per liter, and most preferably from about 3 to about 7 grams per liter. The selectivity of the process is greatly diminished with excessive hydrochloric acid concentrations, and it is therefore preferable to use as small an amount as possible.

The temperature of the solution is preferably maintained as low as possible, consistent with suitable lead chloride extractions. The solution temperature may be permitted to go as high as the boiling temperature under atmospheric conditions by properly controlling the other process variables, but generally speaking such high temperatures result in greater extractions of other metal sulfides in the concentrate. Hence the solution temperature is preferably maintained at less than about 95° C., more preferably at less than about 75° C. and most preferably at about 60° C. and less. The lower limitation is primarily dependent upon suitable reaction times, and at less than about 30° C. the extraction of lead becomes too slow to be practical.

The reaction time is maintained so as to obtain sufficient lead recovery while avoiding extraction of the other metal sulfides. Hence the reaction time is preferably kept to a minimum consistent with the desired lead recoveries. Generally speaking, reaction times of from about 10 minutes to about 4 hours are preferred, with reaction times of from about 30 minutes to about 2 hours being more preferred.

Following the leach reaction, the resulting solid phase, containing unreacted sulfides, elemental sulfur and lead chloride are separated from the leach solution. The separated leach solution is then preferably treated for additional regeneration of the cupric chloride leaching agent, and a portion of the liquid phase is treated for the removal of impurities as necessary. The leach solution regeneration is preferably conducted by air oxidation, preferably within a temperature range of from about 40° C. to about 60° C. Hydrochloric acid is preferably added as the chloride ion source for the necessary oxidation of cuprous chloride to cupric chloride.

When the final elemental lead product is produced by means of hydrogen reduction, hydrochloric acid is a necessary by-product. This hydrochloric acid serves as a convenient source for the oxidation regeneration reaction, and can be obtained by means of scrubbing the hydrogen reduction furnace off-gas. The regenerated cupric chloride leach solution is then recycled to the leach phase of the process.

A portion of the separated leach liquor from the leach stage may be treated in order to remove impurities as necessary in order to prevent excessive solution concentrations of these values. Techniques known to the art, such as cementation, electrolysis, chemical treatment, pH adjustment, and others can be employed, as appropriate, to remove the impurities.

The solids from the cupric chloride leach reaction, comprising lead chloride, elemental sulfur, unreacted metal sulfides and gangue, are then preferably treated for the separation of lead chloride. The lead chloride is preferably solubilized from the residue, and a particularly preferred technique in this respect is the use of a brine leach mechanism. This brine leach is preferably conducted with a brine solution having a sodium chloride concentration of from about 200 to about 300 grams per liter, and more preferably from about 210 to about 250 grams per liter. In addition to or in place of sodium chloride other chlorides such as calcium chloride, magnesium chloride, lithium chloride and potassium chloride may be employed in the solution.

The brine leach is preferably conducted at a temperature in excess of the solution boiling temperature, which, of course, requires a pressurized system. The temperature is preferably maintained from about 100° C. to about 170° C., and more preferably from about 120° C. to about 150° C., and the system pressure is preferably selected so as to accommodate the solution temperature while preventing solution boiling. Pressures from about 30 to about 150 psig are suitable to accomplish this purpose, and the pressure is preferably maintained from about 40 to about 60 psig.

This brine leach, conducted under the described temperatures and pressures, accomplishes a relatively high solubility of lead chloride in a relatively short period of time, while leaving the elemental sulfur and unreacted metal sulfides in the residue phase. Retention times of from about 30 seconds to about 5 minutes are generally adequate to dissolve lead chloride to solution concentrations of at least about 130 grams per liter of lead. Increased lead concentrations as a result of the high temperature and pressure brine leach significantly facilitate further separation processing.

The brine leach may be conducted at lower pressures, including atmospheric pressure, and lower temperatures. However, pressures and temperatures lower than those recited for the preferred range of the brine leach will require more of the brine solution per pound lead chloride and a longer retention time in order to solubilize the leach chloride.

Following the brine leach, the pregnant lead chloride solution is separated from the remaining residue. Conventional separation techniques may be employed, unless the preferred brine leaching technique of high temperature and pressure are utilized during the leach. In such cases, the solid-liquid separation must remain under pressure in order to prevent flash crystallization of the lead chloride from the solution. One preferable technique to accomplish the separation while avoiding flash crystallization is to employ small diameter hydroclones, which permit the pressure to be reduced to atmospheric pressure while employing the pressure drop and hydroclone mechanism to effect the liquid-solid separation. Hydroclone techniques such as those discussed in *The Hydroclone*, D. Bradley, Pergamon Press, Ltd. 1965 may be utilized in this context.

The solid phase resulting from the hydroclone separation may be further processed, as desired, for the recovery of elemental sulfur and for the further processing of the residue to recover any desired metal values therefrom. The elemental sulfur can be recovered by well known processes, such as solvent extraction, flotation, and autoclave size enlargement. The hot brine leach treatment, when conducted above the melting point of sulfur, leaves the sulfur in a form more amenable to physical separation techniques.

The liquid phase from this brine leach, containing the lead chloride, is further processed for the removal of the lead chloride. Preferably the lead chloride is crystallized from the solution. When the pressure brine leach technique is employed, substantial crystallization occurs as a result of the reduction of the system pressure to atmospheric pressure, and further crystallization occurs by means of reducing the solution temperature and/or evaporating the solvent. The solution is preferably vacuum cooled to about 40° C., which reduces the lead chloride concentration in solution to about 15 grams per liter.

The resulting solid lead chloride cake can then be reduced to elemental lead by various techniques. A particularly preferred technique is to employ hydrogen reduction according to the general reaction:

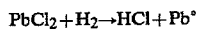
$$PbCl_2 + H_2 \rightarrow HCl + Pb°$$

The furnace operates at between about 600° C. and about 900° C., and it is generally preferred to employ excess hydrogen in order to facilitate the reaction. The lead chloride reduction with hydrogen produces hydrochloric acid, which as discussed earlier, may be scrubbed with spent leach liquor from the cupric chloride leach stage in order to remove the hydrochloric acid and any unreduced lead chloride from the gas and provide a source of chloride ions for the oxidation of cuprous chloride to cupric chloride.

EXAMPLES

Example 1

Concentrates of compositions as hereinafter presented were leached with various agents as set forth in Table 1. Various feed materials were used, designated concentrates A, B and C. Concentrate A comprised 73.9 percent lead, 0.954 percent zinc, 0.559 percent copper, and 3.14 percent iron. Concentrate B comprised 25.1 percent lead, 9.57 percent zinc, 0.36 percent copper, 16.3 percent iron. Concentrate C comprised 12.4 percent lead, 7.53 percent zinc, 2.9 percent copper and 30.4 percent iron. In Test 1, Concentrate A was leached with hydrochloric acid alone. In Test 2 Concentrate A was subjected to a ferrous leach with hydrochloric acid, with oxygen continuously sparged into the slurry to oxidize the ferrous to ferric ions. Test 3 involved a cuprous leach, with gradual addition of the feed and continuous oxygen sparging to oxidize the cuprous to cupric and prevent the slurry oxidizing emf from dropping below about +100 millivolts. Test 4 involved the direct addition of 20 percent excess cupric ion with sufficient hydrochloric acid to maintain the pH at about 1.0. Test 5 involved the same conditions as Test 4 except that the pH was allowed to remain from about 2 to about 2.5 during the leach. Test 6 was conducted the same as Test 4, except that the temperature was lowered to 60° C. In Test 7, the Test 4 conditions were followed except that the leach time was increased to three hours. Tests 8 and 9 employed the same conditions as Test 7 except that in Test 8 concentrate B was leached and in Test 9 concentrate C was leached.

Following each of the leaches the remaining solids were leached in a brine solution at 85° C. and about atmospheric pressure for 30 minutes, and the results of this extraction are set forth in Table 1 as "Leach Results-Extraction Percent", the percentage being based upon initial concentrate weights. The negative copper percentages reported are due to a portion of the cupric chloride of the leach solution being precipitated as copper sulfide.

sulting solids were brine leached in accordance with the procedure set forth in Example 1, and Table 2 presents the resulting extractions.

TABLE 2
COMPARISON OF LEAD CONCENTRATE LEACHES, CUPRIC AND FERRIC CHLORIDE SYSTEMS

| Lead Concentrate Analysis, % | | | | | Type of Leach | Time (hr.) | Temp. (°C.) | Extraction, % | | | |
|---|---|---|---|---|---|---|---|---|---|---|---|
| Pb | Zn | Cu | Fe | S | | | | Pb | Zn | Cu | Fe |
| 72.8 | 1.16 | 0.61 | 3.2 | 14.0 | $Fe^{+3}$ | 1 | 60 | 96.7 | 5.5 | 2.9 | ND |
| 72.8 | 1.16 | 0.61 | 3.2 | 14.0 | $Fe^{+3}$ | 4 | 60 | 99.4 | 22.4 | 21.7 | 21 |
| 72.8 | 1.16 | 0.61 | 3.2 | 14.0 | $Cu^{+2}$ | 1 | 60 | 99.0 | 4.3 | −304 | 1.8 |
| 25.1 | 9.57 | 0.36 | 16.3 | 28.7 | $Fe^{+3}$ | 4 | 60 | 99.6 | 10.9 | 23.4 | ND |
| 25.1 | 9.57 | 0.36 | 16.3 | 28.7 | $Cu^{+2}$ | 3 | 60 | 99.4 | 1.6 | −121 | 0.7 |
| 12.4 | 7.53 | 2.9 | 30.4 | 41.5 | $Fe^{+3}$ | 4 | 60 | 99.3 | 18.4 | 14.0 | ND |
| 12.4 | 7.53 | 2.9 | 30.4 | 41.5 | $Cu^{+2}$ | 3 | 60 | 99.6 | 4.6 | −39.8 | 1.0 |

ND = Not Determined

EXAMPLE 3

Different 100 gram samples of a lead concentrate having a composition of 18 percent lead, 26.2 percent zinc, 0.54 percent copper, 5.1 troy ounces of silver per ton of concentrate, 0.029 percent antimony and 14.4 percent iron were treated with 250 milliliters of a cupric chloride leach solution comprising about 50 grams of copper per liter as cupric chloride and 200 grams of sodium chloride per liter. The pH of the leach solution was maintained at about 1 through the addition of hydrochloric acid. After 3 hours, a total of 4.08 and 4.80 grams of hydrochloric acid were added to Sample 1 and Sample 2, respectively. The cupric chloride leach of Sample 1 was conducted at a temperature of 60° C. and the cupric chloride leach of Sample 2 was conducted at

TABLE I

| Test | Feed | Leach Solution Lixiviant Species, gm/l | | | | | Temp. (°C.) | Time (min.) | Leach Results Extraction, % | | | | Brine Leach Residue (grams) |
|---|---|---|---|---|---|---|---|---|---|---|---|---|---|
| | | $Fe^{+2}$ | $Cu^{+1}$ | $Cu^{+2}$ | HCl | NaCl | | | Pb | Cu | Zn | Fe | |
| 1. | A | — | — | — | 137 | — | 85–90 | 60 | 60.8 | 0.0 | 8.7 | 3.2 | 43.6 |
| 2. | A | 100 with $O_2$ | — | — | 133 | — | 90 | 220 | 93.9 | 6.7 | 16 | 0.0 | 40.5 |
| 3. | A | — | 47.5 with $O_2$ | — | 30 | 200 | 90–95 | 145 | 76.8 | 99.8 | 19.2 | 7.3 | 69.2 |
| 4. | A | — | — | 48 | ≈4.5 pH 1.0 | 200 | 85–90 | 60 | 99.0 | −304 | 4.3 | 3.8 | 6.1 |
| 5. | A | — | — | 47 | ≈3.8 pH 2–2.25 | 200 | 60 | 60 | 94.6 | −107 | 4.2 | 2.5 | 4.7 |
| 6. | A | — | — | 47 | ≈4.8 pH 1.0 | 200 | 60 | 60 | 88.4 | −135 | 3.3 | 3.9 | 19.7 |
| 7. | A | — | — | 60 | ≈5.2 | 200 | 60 | 180 | 98.0 | −312 | 3.3 | 4.3 | 5.4 |
| 8. | B | — | — | 47 | ≈3.4 | 200 | 60 | 180 | 99.4 | −121 | 1.6 | 0.7 | 45.6 |
| 9. | C | — | — | 47 | ≈5.4 | 200 | 60 | 180 | 98.9 | −39.8 | 4.6 | 1.0 | 134.0 |

EXAMPLE 2

Metal extraction percentages are presented for both ferric chloride and cupric chloride leaches using three different feed materials. The ferric chloride leach maintained a ferric to ferrous ratio in grams per liter of about 9:1. The leach was conducted with 20 percent solids and a pH of less than 0.5. The cupric leaches were carried out with a solution of about 50 grams of copper per liter as cupric chloride, 10 percent solids, 5 grams hydrochloric acid per liter and 230 grams sodium chloride per liter, and the pH was maintained at about 1.0. The rea temperature of 80° C. The residue of the cupric chloride leach of each of the samples was separately brine leached in a brine solution containing about 250 grams of sodium chloride per liter at a temperature of 80°–85° C. and about one atmosphere for one-half hour. Each brine leach slurry was filtered while hot and the residue was washed first with hot brine solution and then with water. The analyses of the brine leach residue and the results of this extraction are set forth in Table 3. The negative extracted copper percentages are due to a portion of the cupric chloride of the leach solution being precipitated to copper sulfide.

TABLE 3

| Cupric Leach Time (Hours) | Product | Weight (gm) | Brine Leach Residue Assay, % | | | | | | Extraction, % | | | | | |
|---|---|---|---|---|---|---|---|---|---|---|---|---|---|---|
| | | | Pb | Zn | Cu | Fe | Ag (oz/ton) | Sb | Pb | Zn | Cu | Fe | Ag | Sb |
| Sample 1: | | | | | | | | | | | | | | |
| 1.0 | 1 hr. residue | 4.32 | 0.49 | 36.1 | 0.78 | 20.8 | 1.4 | 0.013 | 98.3 | 11.8 | 7.9 | 7.6 | 82.4 | 71 |
| 3.0 | Final residue | 50.7 | 0.11 | 36.1 | 0.96 | 20.0 | 1.8 | 0.014 | 99.6 | 18.7 | −4.5 | 18.1 | 79.2 | 72 |
| Sample 2: | | | | | | | | | | | | | | |
| 1.0 | 1 hr. residue | 4.43 | 0.10 | 37.4 | 0.98 | 19.8 | 1.2 | 0.018 | 99.6 | 7.2 | −17.5 | 10.6 | 84.7 | 60 |
| 2.0 | 2 hr. residue | 4.52 | 0.08 | 36.7 | 1.00 | 19.2 | 1.1 | 0.011 | 99.7 | 17.4 | −8.9 | 21.3 | 87.3 | 78 |
| 3.0 | Final residue | 48.3 | 0.06 | 36.2 | 1.44 | 19.8 | 1.2 | 0.015 | 99.8 | 22.6 | −49 | 23.0 | 86.8 | 71 |

Example 4

A 125 gram sample of a lead concentrate having a composition of 25.1 percent lead, 9.57 percent zinc, 0.36 percent copper and 16.3 percent iron was treated with 500 milliliters of a cupric chloride leach solution comprising about 50 grams of copper per liter as cupric chloride, 200 grams of sodium chloride per liter and sufficient hydrochloric acid to maintain a pH of about 1. The cupric chloride leach was conducted at a temperature of 60° C. for 2 hours. The residue of the cupric chloride leach was subjected to a 900 milliliter brine leach at a temperature of 80°-90° C. and about atmospheric pressure for one-half hour. The brine solution contained about 250 grams of sodium chloride per liter. The analysis of the brine leach residue, which weighed 83 grams, and the results of the extraction are set forth in Table 4.

The extraction resulted in 19.0 grams of lead chloride being produced. This lead chloride was reduced to lead in an atmosphere of 175 cubic centimeters per minute of hydrogen, 75 cubic centimeters per minute of carbon monoxide, 75 cubic centimeters per minute of carbon dioxide at a temperature of 800° C. for 35 minutes. The lead metal was assayed by emission spectroscopy. The lead metal was 99.98 percent pure. It contained impurities of 0.01 percent silicon, 0.005 percent iron, 0.001 percent copper and 0.001 percent bismuth with no other elements being detected.

TABLE 4

| Brine Leach Residue Assay, % | | | | | |
|---|---|---|---|---|---|
| Pb | Cu | Zn | Fe | Ag (oz/ton) | Sb |
| 0.21 | 0.805 | 13.9 | 22.8 | 2.0 | 0.33 |
| Extraction, % | | | | | |
| Pb | Cu | Zn | Fe | Ag | Sb |
| 99.4 | −48.5 | 3.6 | 7.1 | 81.6 | 32 |

Example 5

A 100 gram sample of a lead concentrate was treated with 250 milliliters of a cupric chloride leach solution comprising about 50 grams of copper per liter as cupric chloride and 200 grams of sodium chloride per liter. The cupric chloride leach was conducted at a temperature of 40° C. for 4 hours with the pH of the leach being maintained at about 1 by the addition of about 4.1 grams of hydrochloric acid throughout the leaching period. The initial composition of the feed, assay of the brine leach residue and the percentage of metals extracted from the feed are given below in Table 5. The negative extracted copper values of Examples 5-13 are due to a portion of the cupric chloride of the leach solution being precipitated to copper sulfide.

Example 6

A 100 gram sample of a lead concentrate having the same composition as the sample of Example 5 was milled for one-half hour in a ceramic pebble mill. The milled concentrate was then treated the same as the concentrate in Example 5. The assay of the brine leach residue and percent metals extracted from the concentrate are given below in Table 5.

Example 7

A 100 gram sample of a lead concentrate having the same composition as the sample of Example 5 was treated with 250 milliliters of a cupric chloride leach containing about 50 grams of copper per liter as cupric chloride and 200 grams of sodium chloride per liter at a temperature of 90°-95° C. for 1 hour. The pH of the leach was maintained at about 1 by the addition of hydrochloric acid. The assay of the brine leach residue and the percentage of metals extracted from the lead concentrate are given in Table 5.

Example 8

A 100 gram sample of a lead concentrate having the same composition as the sample of Example 5 was milled for one-half hour in a ceramic pebble mill and then treated exactly the same as the sample of Example 7. The results are given in Table 5.

Example 9

A 100 gram sample of a lead concentrate having the same composition as the sample of Example 5 was treated with 250 milliliters of a cupric chloride leach solution containing about 10 grams of copper per liter as cupric chloride and 200 grams of sodium chloride per liter at a temperature of 60° C. for 3 hours. The leach solution was subjected to an air sparge of 1 liter per minute to regenerate cupric ions from cuprous ions. The pH of the leach solution was maintained at about 1.0 to 1.2. The lead concentrate was gradually added to the leach solution in order to maintain an oxidizing emf of the slurry at greater than 350 millivolts.

Results are given below in Table 5.

Example 10

A 100 gram sample of a lead concentrate having the same composition as the sample of Example 5 was milled for one-half hour in a ceramic pebble mill and then treated with 250 milliliters of a cupric chloride leach solution containing about 50 grams of copper per liter as cupric chloride and 200 grams of sodium chloride per liter at a temperature of 40° C. for 4 hours. The pH of the leach solution was maintained at about 1.6 by the addition of hydrochloric acid. The assay of the brine leach residue and the percent metals extracted from the lead concentrate are given below in Table 5.

Example 11

A 50 gram sample of a lead concentrate having the same composition as the sample of Example 5 was milled for one-half hour in a ceramic pebble mill and then treated with 125 milliliters of a cupric chloride leach solution comprising about 10 grams of copper per liter as cupric chloride and 200 grams of sodium chloride per liter at a temperature of 40° C. for 4 hours. The leach solution was subjected to an air sparge of 1 liter per minute throughout the leaching process. The pH of the leach solution was maintained at about 1.6 by the addition of hydrochloric acid. The lead concentrate feed was added to the leach solution over the course of the leach in order to maintain an oxidizing emf of the slurry at greater than or equal to 350 millivolts.

The assay of the brine leach residue and the percent metals extracted from the lead concentrate are given below in Table 5.

Example 12

A 50 gram sample of a lead concentrate having the same composition as the sample of Example 5 was milled for one-half hour in a ceramic pebble mill and then treated with 125 milliliters of a cupric chloride leach solution containing about 10 grams of copper per liter as cupric chloride and 20 grams of sodium chloride per liter at a temperature of 40° C. for 4.5 hours. Throughout the course of the leach, the leach solution was subjected to an air sparge of 1 liter per minute. The pH of the leach solution was maintained at about 1.6 and the feed was added over the course of the leach in order to maintain an oxidizing emf of the slurry at 350 millivolts or greater. The assay of the brine leach residue and the percentage of metals extracted from the lead concentrate are given below in Table 5.

Example 13

A 50 gram sample of a lead concentrate having the same composition as the sample of Example 5 was milled for one-half hour in a ceramic pebble mill and then treated with 125 milliliters of a cupric chloride leach solution containing about 10 grams of copper per liter as cupric chloride and 200 grams of sodium chloride per liter at 50° C. for 4.5 hours. Throughout the course of the leach, the leach solution was subjected to an air sparge of 1 liter per minute and the pH of the solution was maintained at about 1.6 by the addition of hydrochloric acid. The final emf of the slurry was +360 millivolts. The assay of the brine leach residue and percentage of metals extracted from the lead concentrate are given below in Table 5.

TABLE 5

| Ex. | Time (Hrs.) | Product | Weight (gm) | Pb | Zn | Cu | Ag (oz/ton) | Sb | Fe | Pb | Zn | Cu | Ag | Sb | Fe |
|---|---|---|---|---|---|---|---|---|---|---|---|---|---|---|---|
| 5 | 0 | Feed | — | 18.0 | 26.2 | 0.54 | 5.1 | 0.029 | 14.4 | — | — | — | — | — | — |
|  | 1 | Residue | 4.97 | 2.06 | 37.5 | 0.86 | 2.3 | — | 19.4 | 92 | 1.2 | −9.9 | 69 | — | 7.0 |
|  | 2 | Residue | 4.68 | 1.85 | 36.3 | 0.83 | 2.3 | — | 20.0 | 93 | 9.9 | 0.1 | 71 | — | 9.7 |
|  | 4 | Residue | 53.0 | 1.36 | 36.5 | 0.89 | 2.3 | 0.010 | 20.2 | 95 | 15 | −0.5 | 72 | 79 | 14 |
| 6 | 1 | Residue | 5.31 | 1.17 | 37.9 | 1.05 | 3.0 | — | 19.7 | 96 | 0.2 | −34 | 59 | — | 5.6 |
|  | 2 | Residue | 4.89 | 0.47 | 38.0 | 1.45 | 1.6 | — | 19.4 | 98 | 4.3 | −77 | 79 | — | 11 |
|  | 4 | Residue | 55.3 | 0.86 | 37.3 | 0.94 | 2.3 | 0.070 | 20.6 | 97 | 8.9 | −11 | 71 | — | 8.4 |
| 7 | 0.08 | Residue | 5.28 | 1.68 | 36.6 | 0.95 | 2.0 | — | 19.2 | 94 | 11 | −12 | 75 | — | 15 |
|  | 0.16 | Residue | 3.89 | 1.16 | 34.3 | 1.02 | 2.2 | — | 20.6 | 96 | 20 | −15 | 74 | — | 13 |
|  | 0.25 | Residue | 4.28 | 0.68 | 35.4 | 1.09 | 2.0 | — | 20.5 | 98 | 20 | −19 | 77 | — | 16 |
|  | 1 | Residue | 44.6 | 0.065 | 36.1 | 1.49 | 1.3 | 0.080 | 19.7 | 99.8 | 21 | −57 | 85 | — | 22 |
| 8 | 0.08 | Residue | 4.38 | 0.52 | 36.0 | 1.02 | 1.5 | — | 19.9 | 98 | 15 | −17 | 82 | — | 14 |
|  | 0.16 | Residue | 4.13 | 0.16 | 35.3 | 0.91 | 1.2 | — | 20.0 | 99.5 | 19 | −1.1 | 86 | — | 17 |
|  | 0.28 | Residue | 4.42 | 0.075 | 36.9 | 1.10 | 1.2 | — | 19.3 | 99.8 | 18 | −18 | 86 | — | 22 |
|  | 1 | Residue | 46.3 | 0.043 | 35.8 | 1.64 | 1.3 | 0.038 | 19.7 | 99.9 | 21 | −76 | 85 | 24 | 21 |
| 9 | 3 | Residue | 62.2 | 2.40 | 31.4 | 0.96 | 1.8 | 0.018 | 19.9 | 91.7 | 26 | −11 | 78 | — | 14 |
| 10 | 1 | Residue | 5.59 | 1.36 | 38.4 | 0.86 | 2.5 | — | 20.4 | 95 | 0.3 | −8.3 | 67 | — | 3.7 |
|  | 2 | Residue | 5.38 | 1.11 | 39.2 | 0.88 | 2.4 | — | 20.9 | 96 | 1.2 | −7.6 | 69 | — | 4.2 |
|  | 4 | Residue | 55.1 | 1.06 | 39.4 | 0.91 | 2.1 | 0.024 | 21.4 | 96 | 2.2 | −9.5 | 73 | 46 | 3.4 |
| 11 | 4 | Residue | 33.3 | 1.30 | 39.8 | 0.83 | 2.4 | 0.029 | 21.5 | 95 | 0.0 | 0.0 | 69 | 33 | 0.6 |
| 12 | 4.5 | Residue | 37.0 | 4.74 | 35.4 | 0.81 | 5.0 | 0.027 | 20.1 | 80 | 0.0 | −11 | 27 | 31 | 0.0 |
| 13 | 4.5 | Residue | 32.7 | 1.84 | 35.6 | 0.89 | 2.2 | 0.023 | 21.0 | 93 | 11.1 | −7.8 | 72 | 48 | 4.6 |

What is claimed is:

1. A process for obtaining lead chloride from sulfide ores containing lead sulfide comprising:
   (a) leaching the ore with an aqueous solution containing cupric chloride under reaction conditions of temperature, time, pH, an oxidizing emf, total copper concentration and total chloride ion concentration selected so as to convert a substantial portion of the lead sulfide to lead chloride while leaving the remainder of the ore substantially unreacted and wherein the cupric chloride leach solution does not solubilize all of the lead chloride so that a portion of the lead chloride precipitates from the leach solution; and
   (b) separating solids comprising lead chloride, unreacted ore, sulfur and gangue from the leach solution.

2. A process for separating lead chloride formed from sulfide ores containing lead sulfide comprising:
   (a) leaching the ore with an aqueous solution containing cupric chloride under reaction conditions of temperature, time, pH, an oxidizing emf, total copper concentration and total chloride ion concentration selected so as to convert a substantial portion of the lead sulfide to lead chloride while leaving the remainder of the ore substantially unreacted and wherein the cupric chloride leach solution does not solubilize all of the lead chloride formed so that a portion of the lead chloride precipitates from the leach solution;
(b) separating solids comprising lead chloride, unreacted ore, sulfur and gangue from the leach solution;
(c) subjecting the separated solids to a brine leach at a temperature of from about 100° C. to about 170° C. and a pressure of from about 30 p.s.i.g. to about 150 p.s.i.g. in order to substantially solubilize the lead chloride to the exclusion of the other solids;
(d) separating the brine leach solution containing the solubilized lead chloride from the solids; and
(e) separating the lead chloride from the brine leach solution separated in step (d).

3. The process of claim 1 or claim 2 wherein the cupric chloride leach solution solubilies less than about 10 percent of the lead chloride formed.

4. The process of claim 1 or claim 2 wherein the cupric chloride of the leach solution of step (a) is regenerated by sparging the leach solution with a source of oxygen.

5. The process of claim 4 wherein the cupric chloride leach solution separated in step (b) is recycled back to step (a).

6. The process of claim 1 or claim 2 wherein a portion of the cupric chloride leach solution of step (a) is removed, treated to remove the dissolved metal chlorides contained therein and thereafter the treated cupric chloride leach solution is returned to step (a).

7. The process of claim 1 or claim 2 wherein the cupric chloride leach of the ore is conducted at a temperature of from about 30° to about 95° C. and a pH between about 0.5 and 4, wherein the cupric chloride leach solution contains from about 3 to about 100 grams of copper in solution per liter of the leach solution and wherein the cupric ion to cuprous ion ratio of the leach solution is maintained within a range of from about 1:20 to about 16:1.

8. The process of claim 7 wherein the leach solution emf is maintained from about 200 to about 500 millivolts so as to cause the formation of elemental sulfur from the sulfide sulfur contained within the ore.

9. The process of claim 7 wherein the chloride ion concentration of the cupric chloride leach solution does not substantially exceed the amount needed to keep the copper in solution and wherein the chloride ion concentration is maintained by the addition of a monovalent, water soluble, chloride salt in an amount containing from about 0.85 moles to about 5 moles of chloride.

10. A process of forming lead chloride from sulfide ores containing lead sulfide comprising:
(a) leaching the ore with an aqueous solution containing cupric chloride and saturated with lead chloride at a temperature of from about 30° C. to about 95° C. and a pH of from about 0.5 to about 4, wherein the cupric chloride leach solution contains from about 3 to about 100 grams of copper in solution per liter of leach solution, and less than about 20 grams of hydrochloric acid per liter of leach solution, and wherein the cupric chloride leach solution has a chloride ion concentration not substantially exceeding the amount of chloride ion needed to keep the copper in solution with the chloride ion concentration being maintained by the addition of a monovalent, water soluble, chloride salt in an amount containing from about 0.85 moles to about 5 moles of chloride per liter of leach solution, has a cupric ion to cuprous ion ratio maintained in the range of about 1:20 to about 16:1 and has an oxidizing emf, so as to convert a substantial portion of the lead sulfide to lead chloride while leaving the remainder of the ore substantially unreacted;
(b) separating solids comprising lead chloride, unreacted ore, sulfur and gangue from the leach solution.

11. A process for separating lead chloride formed from sulfide ores containing lead sulfide comprising:
(a) leaching the ore with an aqueous solution containing cupric chloride and saturated with lead chloride at a temperature of from about 30° C. to about 95° C. and a pH of from about 0.5 to about 4, wherein the cupric chloride leach solution contains from about 3 to about 100 grams of copper in solution per liter of leach solution and less than about 20 grams of hydrochloric acid per liter of leach solution, and wherein the cupric chloride leach solution has a chloride ion concentration not substantially exceeding the amount of chloride ion needed to keep the copper in solution with the chloride ion concentration being maintained by the addition of a monovalent, water soluble, chloride salt in an amount containing from about 0.85 moles to about 5 moles of chloride per liter of leach solution, has a cupric ion to cuprous ion ratio maintained in the range of about 1:20 to about 16:1 and has an oxidizing emf, so as to convert a substantial portion of the lead sulfide to lead chloride while leaving the remainder of the ore substantially ureacted;
(b) separating solids comprising lead chloride, unreacted ore, sulfur and gangue from the leach solution;
(c) subjecting the separated solids to a brine leach at a temperature from about 100° C. to about 170° C. and a pressure of from about 30 p.s.i.g. to about 150 p.s.i.g. in order to substantially solubilize the lead chloride to the exclusion of the other solids;
(d) separating the brine leach solution containing the solubilized lead chloride from the solids; and
(e) separating the lead chloride from the brine leach solution separated in step (d).

12. The process of claim 11 wherein the brine leach of step (c) contains from about 200 to about 300 grams of sodium chloride per liter.

13. The process of claim 10 or claim 11 wherein the cupic chloride contained in the leach solution of step (a) is regenerated by sparging the leach solution with a source of oxygen.

14. The process of claim 13 wherein a bleed stream is taken from the leach solution of step (a), treated to remove dissolved metal chlorides contained therein and then returned to leach step (a).

15. The process of claim 10 or claim 11 wherein the cupric chloride leach solution has a pH of from about 0.5 to about 2 and the cupric chloride leach is conducted at a temperature of from about 30° C. to about 75° C., wherein the cupric chloride leach solution contains from about 5 to about 50 grams of copper in solution per liter of leach solution and from about 1 to about 10 grams of hydrochloric acid per liter of leach solution and wherein the cupric chloride leach solution has a chloride ion concentration not substantially exceeding the amount of chloride ion needed to keep the copper in solution with the chloride ion concentration being maintained by the addition of a monovalent, water soluble, chloride salt in an amount containing from about 1.7 moles to about 4.3 moles of chloride per liter of leach solution, has a cupric ion to cuprous ion ratio of from about 1:9 to about 4:1 and has an emf of from about 250 to about 450 millivolts.

16. The process of claim 15 wherein the chloride ion concentration is maintained by the addition of from about 100 grams to about 250 grams of sodium chloride per liter of cupric chloride leach solution.

17. The process of claim 10 or claim 11 wherein at least a portion of the cupric chloride leach solution saturated with lead chloride is supplied from the separated leach solution of step (b).

18. A process of forming lead chloride from sulfide ores containing lead sulfide comprising:
   (a) leaching the ore with an aqueous solution containing cupric chloride and saturated with lead chloride at a temperature of from about 30° C. to about 60° and a pH of from about 0.5 to about 2, wherein the cupric chloride leach solution contains from about 8 grams to about 25 grams of copper in solution per liter of leach solution and from about 3 grams to about 7 grams of hydrochloric acid per liter of leach solution and wherein the cupric chloride leach solution has a cupric ion to cuprous ion ratio of from about 1:5 to about 3:1, has an emf of from about 350 to about 400 millivolts and has a chloride ion concentration not substantially exceeding the amount of chloride ion needed to keep the copper in solution with the chloride ion concentration being maintained by the addition of sodium chloride in an amount of from about 100 grams to about 250 grams of sodium chloride per liter of leach solution, so as to convert a substantial portion of the lead sulfide to lead chloride while leaving the remainder of the ore substantially unreacted; and
   (b) separating the solids comprising lead chloride, unreacted ore, sulfur and gangue from the leach solution.

19. A process of separating leach chloride formed from sulfide ores containing lead sulfide comprising:
   (a) leaching the ore with an aqueous solution containing cupric chloride and saturated with lead chloride at a temperature of from about 30° C. to about 60° C. and a pH of from about 0.5 to about 2, wherein the cupric chloride leach solution contains from about 8 grams to about 25 grams of copper in solution per liter of leach solution and from about 3 grams to about 7 grams of hydrochloric acid per liter of leach solution and wherein the cupric chloride leach solution has a cupric ion to cuprous ion ratio of from about 1:5 to about 3:1, has an emf of from about 350 to about 400 millivolts and has a chloride ion concentration not substantially exceeding the amount of chloride ion needed to keep the cooper in solution with the chloride ion concentration being maintained by the addition of sodium chloride in an amount of from about 100 grams to about 250 grams of sodium chloride per liter of leach solution, so as to convert a substantial portion of the lead sulfide to lead chloride while leaving the remainder of the ore substantially unreacted; and
   (b) separating the solids comprising lead chloride, unreacted ore, sulfur and gangue from the leach solution;
   (c) subjecting the separated solids to an aqueous brine leach containing from about 210 to about 250 grams of sodium chloride per liter of leach at a temperature of from about 120° C. to about 150° C. and a pressure of from about 40 p.s.i.g. to about 60 p.s.i.g. in order to substantially solubilize the lead chloride to the exclusion of the other solids;
   (d) separating the brine leach solution containing the solubilized lead chloride from the solids; and
   (e) crystallizing the lead chloride from the separated brine leach solution of step (d).

20. The process of claim 18 or claim 19 wherein the cupric chloride contained in the leach solution of step (a) is regenerated by sparging the leach solution with a source of oxygen, wherein a bleed stream is taken from the leach solution of step (a), treated to remove dissolved metal chlorides contained therein and then returned to leach step (a) and wherein at least a portion of cupric chloride leach solution is comprised of the separated leach solution of step (b).

21. The process of claim 20 wherein the crystallized lead chloride of step (e) is reduced to obtain elemental lead.

* * * * *